United States Patent
Sandberg et al.

(10) Patent No.: US 12,010,067 B2
(45) Date of Patent: Jun. 11, 2024

(54) SLOT-BASED CSI REPORT CONFIGURATION FOR DYNAMIC TDD

(71) Applicant: Telefonaktiebolaget LM Ericsson (publ), Stockholm (SE)

(72) Inventors: Sara Sandberg, Luleå (SE); Sebastian Faxér, Järfälla (SE); Shiwei Gao, Nepean (CA); Arne Simonsson, Gammelstad (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 710 days.

(21) Appl. No.: 17/263,351

(22) PCT Filed: Aug. 10, 2018

(86) PCT No.: PCT/SE2018/050816
§ 371 (c)(1),
(2) Date: Jan. 26, 2021

(87) PCT Pub. No.: WO2020/032842
PCT Pub. Date: Feb. 13, 2020

(65) Prior Publication Data
US 2021/0328746 A1    Oct. 21, 2021

(51) Int. Cl.
*H04L 5/00*     (2006.01)
*H04L 5/14*     (2006.01)
*H04W 72/0446*  (2023.01)

(52) U.S. Cl.
CPC .......... *H04L 5/0057* (2013.01); *H04L 5/1469* (2013.01); *H04W 72/0446* (2013.01)

(58) Field of Classification Search
CPC . H04L 5/0057; H04L 5/1469; H04W 72/0446
(Continued)

(56) References Cited

U.S. PATENT DOCUMENTS

2007/0243878 A1* 10/2007 Taira ............... H04W 16/28
                                                455/450
2014/0160967 A1*  6/2014 Gao ................ H04W 24/10
                                                370/252
(Continued)

FOREIGN PATENT DOCUMENTS

| EP | 3188528 A1 | 7/2017 |
|----|------------|--------|
| WO | 2014098915 A1 | 6/2014 |
| WO | 2014113902 A1 | 7/2014 |

OTHER PUBLICATIONS

EPO Communication and Supplementary European Search Report dated Feb. 28, 2022 for Patent Application No. 18929829.2, consisting of 7-pages.
(Continued)

*Primary Examiner* — Chi Tang P Cheng
(74) *Attorney, Agent, or Firm* — Weisberg I.P. Law, P.A.

(57) ABSTRACT

A method for operating a cell, performed by a network node. The method includes transmitting a frame comprising a set of slots receiving Channel State Information, CSI, reports at least indicative of interference measured by a user equipment using the set of slots, estimating a transmission direction pattern of an adjacent cell relative a transmission direction pattern of the cell based on the received CSI reports, and transmitting a signal to the user equipment based on the estimated transmission direction pattern of the adjacent cell.

17 Claims, 9 Drawing Sheets

(58) Field of Classification Search
USPC .......................................................... 370/280
See application file for complete search history.

(56) References Cited

U.S. PATENT DOCUMENTS

2016/0183232 A1* 6/2016 Stirling-Gallacher ......................
  H04L 5/0092
  370/280
2016/0197690 A1* 7/2016 Li ...................... H04L 25/0224
  370/278
2017/0289831 A1 10/2017 Park et al.

OTHER PUBLICATIONS

3GPP TSG RAN WG1 Meeting #75 R1-135507; Title: Some Viewpoints about Reconfiguration Signaling Design; Agenda Item: 6.2.1.2; Source: NTT Docomo; Document for: Discussion and Decision; Date and Location: Nov. 11-15, 2013, San Francisco, USA, consisting of 5-pages.

International Search Report and Written Opinion dated May 15, 2019 for International Application No. PCT/SE2018/050816 filed on Aug. 10, 2018, consisting of 9-pages.

3GPP TSG RAN WG1 NR Ad Hoc Meeting R1-1711632; Title:Channel and interference measurement for CSI acquisition; Agenda Item: 5.1.2.3.2; Source: Huawei, HiSilicon; Document for: Discussion and decision; Date and Location: Jun. 27-30, 2017, Qingdao, China, consisting of 12-pages.

* cited by examiner

| Cell | Slot number | | | | | | | | | |
|---|---|---|---|---|---|---|---|---|---|---|
| | 0 | 1 | 2 | 3 | 4 | 5 | 6 | 7 | 8 | 9 |
| QQ160 | D | X | U | U | X | D | X | U | U | X |
| QQ160B | D | X | U | U | X | D | D | D | D | D |

| Radio frame index | ... | n | | | | | | | | | |
|---|---|---|---|---|---|---|---|---|---|---|---|
| Slot index | ... | k | k+1 | k+2 | k+3 | k+4 | k+5 | k+6 | k+7 | k+8 | k+9 |
| Slots | ... | D | x | U | U | U | D | D | D | D | D |
| Channel measurement resource (CSI-RS) | | CSI-RS | | | | | CSI-RS | CSI-RS | CSI-RS | CSI-RS | CSI-RS |
| measured channel | | c(k) | | | | | c(k+5) | c(k+6) | c(k+7) | c(k+8) | c(k+9) |
| Interference measurement (CSI-IM) | | CSI-IM | | | | | CSI-IM | CSI-IM | CSI-IM | CSI-IM | CSI-IM |
| Measured interference | | i(k) | | | | | i(k+5) | i(k+6) | i(k+7) | i(k+8) | i(k+9) |
| CSI estimate and report | | CSI(m) | | | | | CSI(m+1) | CSI(m+2) | CSI(m+3) | CSI(m+4) | CSI(m+5) |

Fig. 9A

| Radio frame index | ... | n | | | | | | | | | |
|---|---|---|---|---|---|---|---|---|---|---|---|
| Slot index | ... | k | k+1 | k+2 | k+3 | k+4 | k+5 | k+6 | k+7 | k+8 | k+9 |
| Slots | ... | D | x | U | U | U | D | D | D | D | D |
| Channel measurement resource (CSI-RS) | | CSI-RS | | | | | CSI-RS | | | | |
| measured channel | | c(k) | | | | | c(k+5) | | | | |
| Interference measurement (CSI-IM) | | CSI-IM | | | | | CSI-IM | CSI-IM | CSI-IM | CSI-IM | CSI-IM |
| Measured interference | | i(k) | | | | | i(k+5) | i(k+6) | i(k+7) | i(k+8) | i(k+9) |
| CSI estimate and report | | CSI(m) | | | | | CSI(m+1) | CSI(m+2) | CSI(m+3) | CSI(m+4) | CSI(m+5) |

Fig. 9B

| Radio frame index | ... | n | | | | | | | | | |
|---|---|---|---|---|---|---|---|---|---|---|---|
| Slot index | ... | k | k+1 | k+2 | k+3 | k+4 | k+5 | k+6 | k+7 | k+8 | k+9 |
| Slots | ... | D | x | U | U | U | D | D | D | D | D |
| Channel measurement resource (CSI-RS) | | CSI-RS | | | | | | | | | |
| measured channel | | c(k) | | | | | | | | | |
| Interference measurement (CSI-IM) | | CSI-IM | | | | | | CSI-IM | | CSI-IM | |
| Measured interference | | i(k) | | | | | | i(k+6) | | i(k+8) | |
| CSI estimate and report | | CSI(m) | | | | | | CSI(m+1) | | CSI(m+2) | |

Fig. 9C

SLOT-BASED CSI REPORT CONFIGURATION FOR DYNAMIC TDD

CROSS-REFERENCE TO RELATED APPLICATIONS

This application is a Submission Under 35 U.S.C. § 371 for U.S. National Stage Patent Application of International Application Number: PCT/SE2018/050816, filed Aug. 10, 2018 entitled "SLOT-BASED CSI REPORT CONFIGURATION FOR DYNAMIC TDD," the entirety of which is incorporated herein by reference.

The present invention relates to a method for operating a cell in a wireless network. The invention further relates to a method for operating a user equipment in a wireless network.

BACKGROUND

New radio (NR) is the radio interface for fifth generation of wireless networks (5g). NR design is based on a flexible structure where any time domain resource for transmission can be allocated for DownLink (DL) or UpLink (UL) or a combination of both, and resembles Time Division Duplex (TDD) type of operation in LTE.

The flexible design of resource allocation in NR, in particular for time resources, is sometimes referred to as Dynamic TDD operation. This enables NR to maximally utilize available radio resources in the most efficient way for both traffic or transmission directions, i.e. uplink UL and downlink DL.

Some conventional technologies only support static TDD where time domain resources are split between downlink and uplink based on a long-term configuration. One drawback with static TDD is that it can be very inefficient, particularly when only one traffic direction exists since the other dedicated time resources for the other direction is wasted or not used. E.g. in LTE as well as NR, neighboring cells typically have the same uplink-downlink configuration to avoid severe interference between uplink and downlink transmissions. This makes it difficult to dynamically change uplink-downlink configuration according to current traffic patterns.

If Dynamic TDD is employed, and neighboring cells are allowed to have different uplink-downlink configurations, there may be several cases of severe so called cross-link interference, CLI. For example, a user equipment, UE, on the cell edge receiving downlink may be significantly interfered by a nearby UE simultaneously transmitting in uplink to a neighboring base station with a different and conflicting uplink-downlink configuration.

Even in scenarios where the channel is changing relatively slowly, interference and CLI may vary quickly in a slot-periodic pattern depending on the uplink-downlink transmission direction configurations selected for neighboring cells, and which UE that is scheduled in the neighboring cell.

A problem with conventional solutions is that such quick variation of the interference cannot be captured by the periodic or semi-persistent CSI, since the shortest CSI-RS/CSI-IM periodicity is 5 ms. Significant changes in interference levels may occur on slot level, e.g. 1 ms or shorter depending on the numerology used.

Conventional solutions include aperiodic CSI, which can be used to trigger a CSI measurement in a specific slot, but this has the disadvantage that it will result in large PDCCH and CSI-RS overhead in order to capture different UL-DL allocation patterns in adjacent/neighboring cells. The worst-case scenario is that CSI measurements and reports are triggered in every serving cell's DL slot. A further limitation is that the UE capability regarding the number of CSI report settings can limit the ability to capture UL-DL slot allocation and corresponding interference pattern. The maximum UE capability is 4 CSI report settings for each time-domain behavior of the CSI report.

A further problem is that networks of different operators in the same area may be operated in adjacent frequencies, thereby generating inter operator CLI. This is due to independent UL power control among different cells and/or among different operators. The transmit power of UEs belonging to other operators cannot be controlled, which could result in severe interference. E.g. when the UEs have large path losses to their serving base stations and large transmit powers are used to compensate for the path losses. E.g. the spectrum mask required for adjacent channel suppression is smaller than the path loss difference between the other operators UE and own base station. A further problem occurs if the operators networks are not synchronized, and/or use different TDD pattern configurations. The interference can then differ periodically between different sub-frames or slots due to UL-DL colliding sub-frames or slots.

The level of the interference in the UL-DL colliding (CLI) sub-frames or slots will depend on UEs individual positions, both for the co-channel case and the adjacent channel case. If UEs are well separated there will not be any significant interference. A cell common configuration or co-ordination, similar to static TDD, will be less efficient.

Thus, there is a need for an improved method for CSI report configuration for dynamic TDD.

OBJECTS OF THE INVENTION

An objective of embodiments of the present invention is to provide a solution which mitigates or solves the drawbacks described above.

SUMMARY OF THE INVENTION

The above and further objectives are achieved by the subject matter described herein. Further advantageous implementation forms of the invention are described herein.

According to a first aspect of the invention, the above mentioned objectives are achieved by a method for operating a cell, performed by a network node, the method comprising transmitting a frame comprising a set of slots receiving Channel State Information, CSI, reports at least indicative of interference measured by a user equipment using the set of slots, estimating a transmission direction pattern of an adjacent cell relative a transmission direction pattern of the cell based on the received CSI reports, and transmitting a signal to the user equipment based on the estimated transmission direction pattern of the adjacent cell.

In one embodiment according to the first aspect, all slots configurable for downlink transmission, by the network node, are selected to the set of slots.

In one embodiment according to the first aspect, all slots configurable for either uplink or downlink transmission, by the network node, are selected to the set of slots.

In one embodiment according to the first aspect, the method further comprises calculating a statistical measure of interference levels, of each slot of the set of slots, using the CSI reports and previously received historical CSI reports and where the one or more transmission direction patterns of the one or more adjacent cells are estimated using the statistical measures.

In one embodiment according to the first aspect, the method further comprises sending a Channel State Information, CSI, measurement configuration message indicative of the set of slots to the user equipment.

In one embodiment according to the first aspect, the measurement configuration message is further indicative of interference measurements in every slot of the set of slots and channel measurements in a subset of the set of slots.

In one embodiment according to the first aspect, the method further comprises selecting an updated set of slots being selected from all slots comprised in the frame and repeating the steps of the first aspect using the updated set.

In one embodiment according to the first aspect, the method further comprises determining that one or more of the statistical measures are stationary and selecting only one slot out of the corresponding slots, having the stationary statistical measures, to be included in the updated set.

In one embodiment according to the first aspect, where the updated set is selected only for every Nth frame, wherein the number N is selected as a multiple of a total number of slots in the frame. In one embodiment according to the first aspect, the number N is selected dependent on a channel measure indicative of how fast a channel between the network node and the user equipment changes.

In one embodiment according to the first aspect, the CSI reports are further indicative of channel quality of one or more slots of the set of slots, wherein the step of transmitting further comprises estimating channel quality for the remaining slots comprised in the frame using the one or more transmission direction patterns of one or more adjacent cells and the channel quality of the CSI report and scheduling slot transmission and/or performing slot link adaptation using the channel quality of the CSI report and the estimated channel quality.

At least one advantage of this aspect of the disclosure is that overhead can be reduced whilst maintaining an acceptable quality of the information indicating CLI/interference and/or channel quality between the network node and the user equipment.

According to a second aspect of the invention, the above mentioned objectives are achieved by a method performed by a user equipment, the method comprising receiving a Channel State Information, CSI, measurement configuration message indicative of a set of slots comprised in a frame from a network node, measuring interference using the set of slots, sending a Channel State Information, CSI, report indicative of interference measured using the set of slots and receiving a signal from the from the network node, wherein the signal have been transmitted based on an estimated transmission direction pattern an adjacent cell.

In an embodiment according to the second aspect, the measurement configuration message is further indicative of interference measurements to be performed in every slot of the set of slots, and, channel measurements to be performed in a subset of the set of slots, where interference is measured in every slot of the set of slots and the channel is measured in a subset of the set of slots.

According to a third aspect of the invention, the above mentioned objectives are achieved by a network node comprising processing circuitry configured to perform any of the steps according to the first aspect.

According to a fourth aspect of the invention, the above mentioned objectives are achieved by a user equipment comprising processing circuitry configured to perform any of the steps according to the second aspect.

According to a fifth aspect of the invention, the above mentioned objectives are achieved by a computer program comprising computer-executable instructions for causing a network node, when the computer-executable instructions are executed on a processing unit comprised in the network node, to perform any of the method steps according the first aspect.

According to a sixth aspect of the invention, the above mentioned objectives are achieved by a computer program comprising computer-executable instructions for causing a user equipment (UE), when the computer-executable instructions are executed on a processing unit comprised in the user equipment (UE), to perform any of the method steps according to the second aspect.

According to a seventh aspect of the invention, the above mentioned objectives are achieved by a computer program product comprising a computer-readable storage medium, the computer-readable storage medium having the computer program according to the fifth or sixth aspect.

According to an eighth aspect of the invention, the above mentioned objectives are achieved by a carrier containing the computer program according to the fifth or sixth aspect, where the carrier is one of an electronic signal, optical signal, radio signal, or computer readable storage medium.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 9A-C shows examples of measurement configurations or CLI reporting configurations according to one or more embodiments of the present disclosure.

Figure 1:
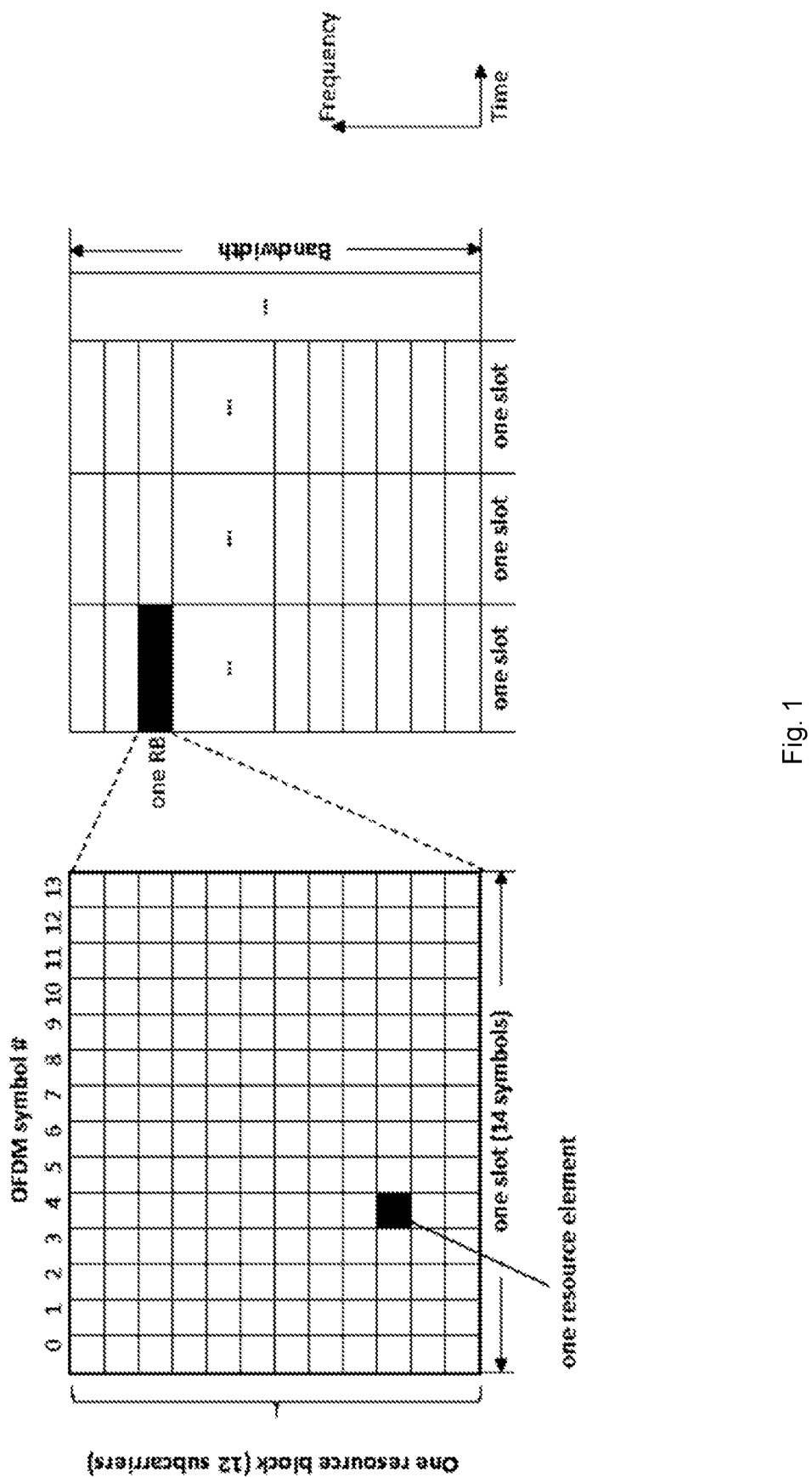
FIG. 1 shows physical resources according to one or more aspects of the present disclosure.

A more complete understanding of embodiments of the invention will be afforded to those skilled in the art, as well as a realization of additional advantages thereof, by a consideration of the following detailed description of one or more embodiments. It should be appreciated that like ref-

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In this disclosure the term "transmission direction pattern" denotes a data structure indicative of intended or allocated transmission directions for a set of physical resources used in one or more cells, typically time resources and or time intervals used for transmission or reception of signals. Examples of such time resources are Transmission Time Intervals, TTI, where the TTI may comprise a subframe and/or a slot, e.g. forming parts of a radio frame. In one example, "transmission direction pattern" indicates a transmission direction, e.g. uplink, downlink or undefined, for each TTI of a set of TTIs.

In Time Division Duplex, TDD, some TTIs/subframes/slots may be allocated for uplink transmission direction and some subframes/slots are allocated for downlink transmission direction. The switch between downlink and uplink transmission direction occurs e.g. in so called special subframes (LTE) or flexible subframes (NR). In the example of LTE, seven different uplink-downlink configurations are provided, e.g. in TS 36.211, Table 4.2-2. Further, the size of the guard period (and hence the number of symbols for DwPTS and UwPTS in the special subframe) can also be configured from a set of possible selections.

In the example of NR, on the other hand, many different uplink-downlink configurations are provided. There may e.g. be 10 to 320 slots per radio frame (where each radio frame has a duration of 10 ms) depending on subcarrier spacing. Each slot can be configured with a slot format, e.g. as in TS 38.211, Table 4.3.2-3. The OFDM symbols in a slot are classified as 'downlink', 'flexible', or 'uplink'. If dynamic Slot Format Indication (SFI) is used, where the format of a slot is indicated with Downlink Control Information, DCI, Format 2_0. As an alternative to this, a semi-static TDD UL-DL configuration may be used where the TDD configuration is RRC configured using the IE TDD-UL-DL-ConfigCommon.

In other words, the number of UL and DL slots, as well as the guard period (the number of UL and DL symbols in the flexible slot(s)) may be almost arbitrarily configured within the TDD periodicity. This in turn, allows for very flexible uplink-downlink configurations.

CSI and interference information needed for scheduling and link adaptation can be reported by the UE to the base station on a periodic, semi-persistent or aperiodic basis. Typically, the faster the channel varies, the shorter the reporting periodicity should preferably be. For periodic or semi-persistent CSI reporting, there is an associated periodicity and slot offset for transmitting the CSI reports.

The periodicity may vary from only a few milliseconds to hundreds of milliseconds. In the example of New Radio, NR, NR allows a Channel State Information Reference Symbol, CSI-RS, Channel State Information Interference Measurement, CSI-IM, and Channel State Information, CSI, reporting periodicity of {5, 10, 20, 40, 80, 160, 320, 640} slots. For periodic and semi-persistent CSI reporting on PUCCH, the slot offset is the starting slot within each reporting period in which CSI is measured, so that any slot can be configured as the starting slot. For semi-persistent CSI reporting on PUSCH, the slot offset is with respect to the slot in which the activation DCI is transmitted and is dynamically indicated in the activation DCI from a set of preconfigured values. CSI-RS and CSI-IM are typically configured with the same periodicity and offset and measured in the same slot.

In one illustrative example, two neighboring or adjacent cells have different uplink-downlink transmission direction configurations. As an example, we consider NR with 15 kHz sub-carrier spacing and an LTE-like uplink-downlink configuration. By using slot formats 0 and 1, all symbols in a slot can be configured to transmit in the same direction. Some other slot format is selected for the flexible slots to allow for switching between uplink and downlink. In a frame or radio frame with 10 slots, cell 1 and cell 2 may have different transmission directions in a slot 7 and a slot 8 and somewhat different also in slot 6 and 9. It is therefore likely that the interference situation is completely different in slots 0-5 compared to in slots 6-9. A UE in cell 2 may experience high interference in slots 6-9 from a nearby UE in cell 1 transmitting in uplink. To measure the different types of CLI interference that may occur during one radio frame, UEs in cell 2 should measure interference in one slot where cell 1 has a downlink slot and in one slot where cell 1 has an uplink slot. The base station receiving the CQI reports may then, given the uplink-downlink configuration of the neighboring cell, estimate the channel quality in the remaining slots.

If the symbol level flexibility of the NR uplink-downlink configurations is utilized, different interference situations may be detected on symbol level. For example, UEs in cell 2 should measure interference in one symbol where cell 1 has a downlink symbol and in one symbol where cell 1 has an uplink symbol. As before, the base station receiving the CQI reports may then, given the uplink-downlink configuration of the neighboring cell, estimate the channel quality in the remaining symbols of the radio frame.

By measuring interference and reporting CSI for several slots/symbols in a radio frame, the interference pattern caused by different cells having different uplink-downlink transmission direction configuration may be captured. Furthermore, if the channel is slowly varying, the short-term interference variations due to the uplink-downlink configurations can be captured even though CSI reports are not sent so often.

The uplink-downlink transmission direction configuration is defined per slot or symbol. In NR it is also possible to partition the bandwidth of the TDD spectrum into uplink and downlink parts, with a guard band in between. Such flexible TDD operation, also called TDD bandwidth partitioning, makes it possible to use an uplink-heavy uplink-downlink configuration to achieve low latency without sacrificing much of the downlink capacity since parts of the bandwidth in an uplink slot can be used for downlink. Even though it is not explicitly stated in the description below, CSI reporting can be configured to take not only different uplink-downlink configurations into account, but also account for flexible TDD operation/TDD bandwidth partitioning.

In brief, the present disclosure provides an improvement which is achieved when configuring CSI reports. This is achieved by taking into account the difference in interference that may result from neighboring or adjacent channel cells having different uplink-downlink transmission direction configurations. Different configurations of CSI-RS and CSI-IM are proposed, depending on a transmission direction pattern of an adjacent cell relative a transmission direction pattern of the serving cell. By doing so, the difference in interference between slots/symbols in a radio frame can be captured. In other words scheduling and link adaptation can be adapted to the current interference situation. The existing CSI framework in NR Rel-15 is considered.

Advantages of the present disclosure include:

With CQI reported accurately for different combinations of uplink/downlink transmissions, scheduling and link adaptation can be adapted to the current interference situation. This will result in improved communication network throughput.

Knowledge of the interference situation through accurately reported CQI may also relax operator co-existence and coordination requirements, since the impact of such interference can be reduced by using accurate link adaptation.

FIG. 1 shows physical resources in NR. The basic NR physical resources can thus be seen as a time-frequency grid as illustrated in the figure, where each resource element, RE, corresponds to one OFDM subcarrier during one OFDM symbol interval. Resource allocation in a slot is described in terms of frequency resources, i.e. resource blocks (RBs) in the frequency domain, and number of time resources, i.e. OFDM symbols in the time domain. A RB may e.g. correspond to 12 contiguous subcarriers and a slot consists of 14 OFDM symbols.

Different subcarrier spacing values are supported in NR. The supported subcarrier spacing values (also referred to as numerologies) in NR are given by $\Delta f=(15 \times 2^{\alpha})$ kHz where $\alpha$ is a non-negative integer.

Figure 2:
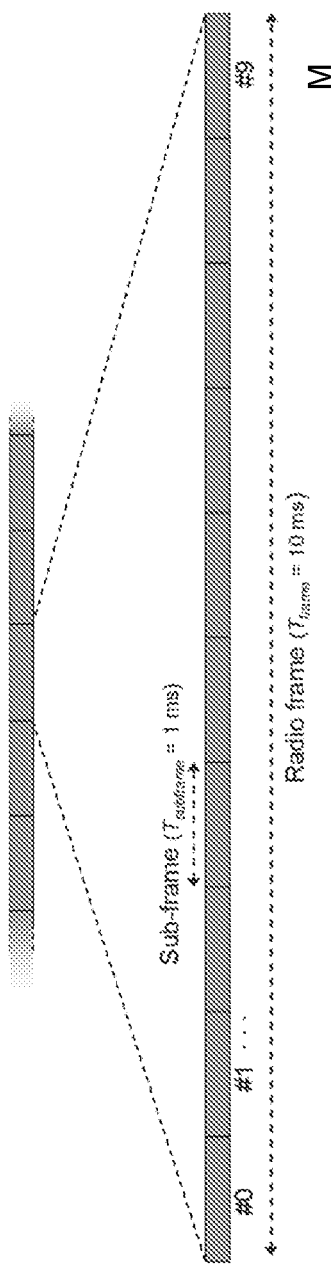
FIG. 2 shows a frame or radio frame divided into slots according to one or more aspects of the present disclosure.

FIG. 2 shows a frame or radio frame divided into slots. In the time domain, downlink and uplink transmissions in NR are organized into equally-sized subframes similar to LTE. A subframe is further divided into slots. The number of slot per subframe is $2^{\alpha+1}$ for a numerology of $(15 \times 2^{\alpha})$ kHz.

Figures 3A, 3B:
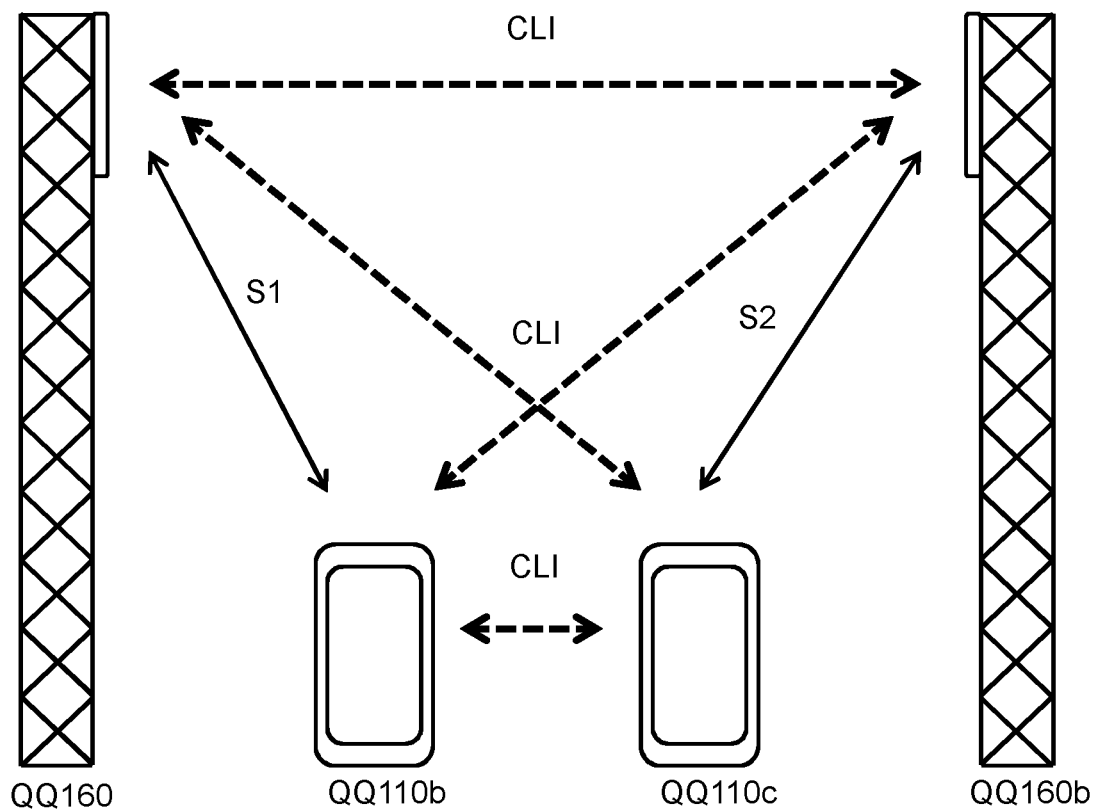
FIG. 3A illustrates the cross-link interference problem.
FIG. 3B illustrates transmission direction patterns of network nodes according to one or more aspects of the present disclosure.

FIG. 3A illustrates the cross-link interference, CLI, problem, e.g. in a 5G NR network. As shown in FIG. 3A, if two cells have different traffic directions, e.g. UE1 QQ110b operating in downlink transmission direction may experience very strong cross-link interference from UE2 QQ110c operating in uplink transmission direction, which can be closer to UE1 than the serving AP1 (Access point 1) QQ160. From AP2 QQ160b in an uplink perspective, AP2 QQ160b may also experience cross-link interference from AP1 QQ160 since AP1 QQ160 is transmitting. Handing this cross-link interference is one of important tasks in order to ensure gains from dynamic TDD operation. The simplest solution to minimize the cross-link interference can be defining signaling between APs. However, real-time signaling usually requires overhead and complexity in the equipment used. Therefore, a more intelligent solution for cross-link interference management without inter-cell signaling is required.

FIG. 3B illustrates transmission direction patterns of network nodes and potential cross-link interference, CLI, between slots or time slots. The potential CLI is indicated by the ellipses encircling the transmission direction patterns of both network nodes. Time slots are time resources used when communicating between any of the base stations QQ160, QQ160b and/or UEs QQ110b, QQ110c. With reference to FIG. 3A, a first signal S1 is exchanged between a first base station QQ160 and UE1 QQ110b operating alternatively in downlink and uplink transmission direction, signified with "D" and "U" in FIG. 3B. Some slots may be flexibly configurable for downlink or uplink alternatively, and are signified with "X". A second signal S2 is exchanged between a second adjacent base station QQ160b and UE2 QQ110c operating alternatively in downlink and uplink transmission direction.

In one example shown in FIG. 3B, two UEs which are not geographically adjacent, UE1 QQ110b and UE2 QQ110c, are operating in uplink transmission direction during the time slots $TS_2$ and $TS_3$. No CLI due to transmission direction is then generated.

In one further example shown in FIG. 3B, both the first base station QQ160 and the second base station QQ160b are operating in the downlink transmission direction during the time slots $TS_0$ and $TS_5$. No CLI due to transmission direction is then generated.

However, during the time slots $TS_1$, $TS_4$, $TS_6$, $TS_7$, $TS_8$ and $TS_9$ the first base station QQ160 and the second base station QQ160b are or could be configured to be operated in different transmission directions, potentially resulting in CLI. The table shown in FIG. 3B can be seen as an example of a transmission direction pattern. Likewise, UE1 QQ110b and UE2 QQ110c are or could be configured to be operated in different transmission directions, potentially resulting in CLI.

Figure 4:
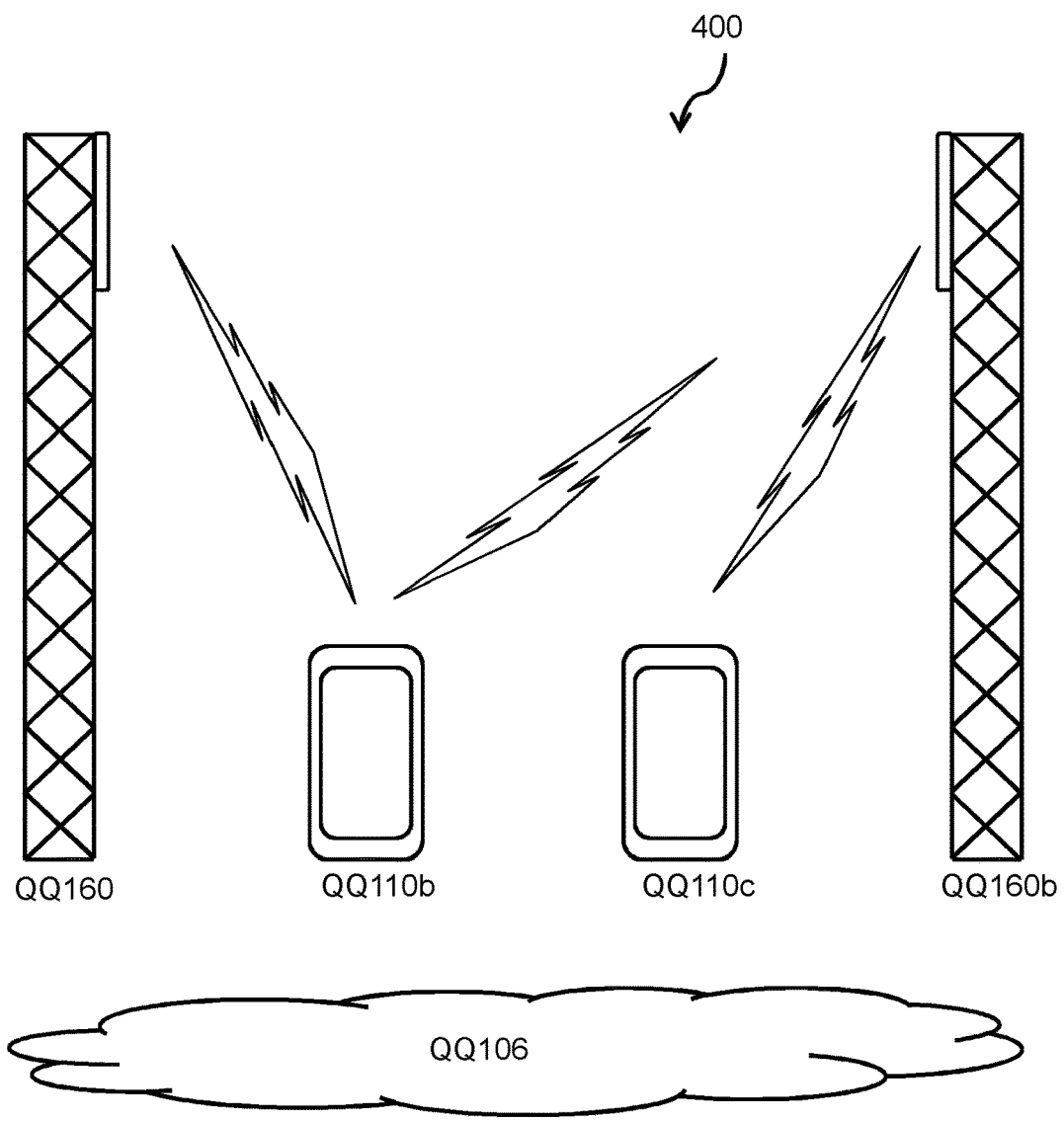
FIG. 4 shows a wireless network in accordance with some embodiments of the present disclosure.

FIG. 4 shows a wireless network in accordance with some embodiments of the present disclosure. Although the subject matter described herein may be implemented in any appropriate type of system using any suitable components, the embodiments disclosed herein are described in relation to a wireless network, such as the example wireless network 400 illustrated in FIG. 4. For simplicity, the wireless network of FIG. 4 only depicts network QQ106, base stations/network nodes QQ160 and QQ160b, and wireless Devices WDs or UEs QQ110, QQ110b. In practice, a wireless network may further include any additional elements suitable to support communication between wireless devices or between a wireless device and another communication device, such as a landline telephone, a service provider, or any other network node or end device. Of the illustrated components, network node QQ160 and wireless device, WD, QQ110 are depicted with additional detail in FIGS. 5 and 6 respectively. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Figure 5:
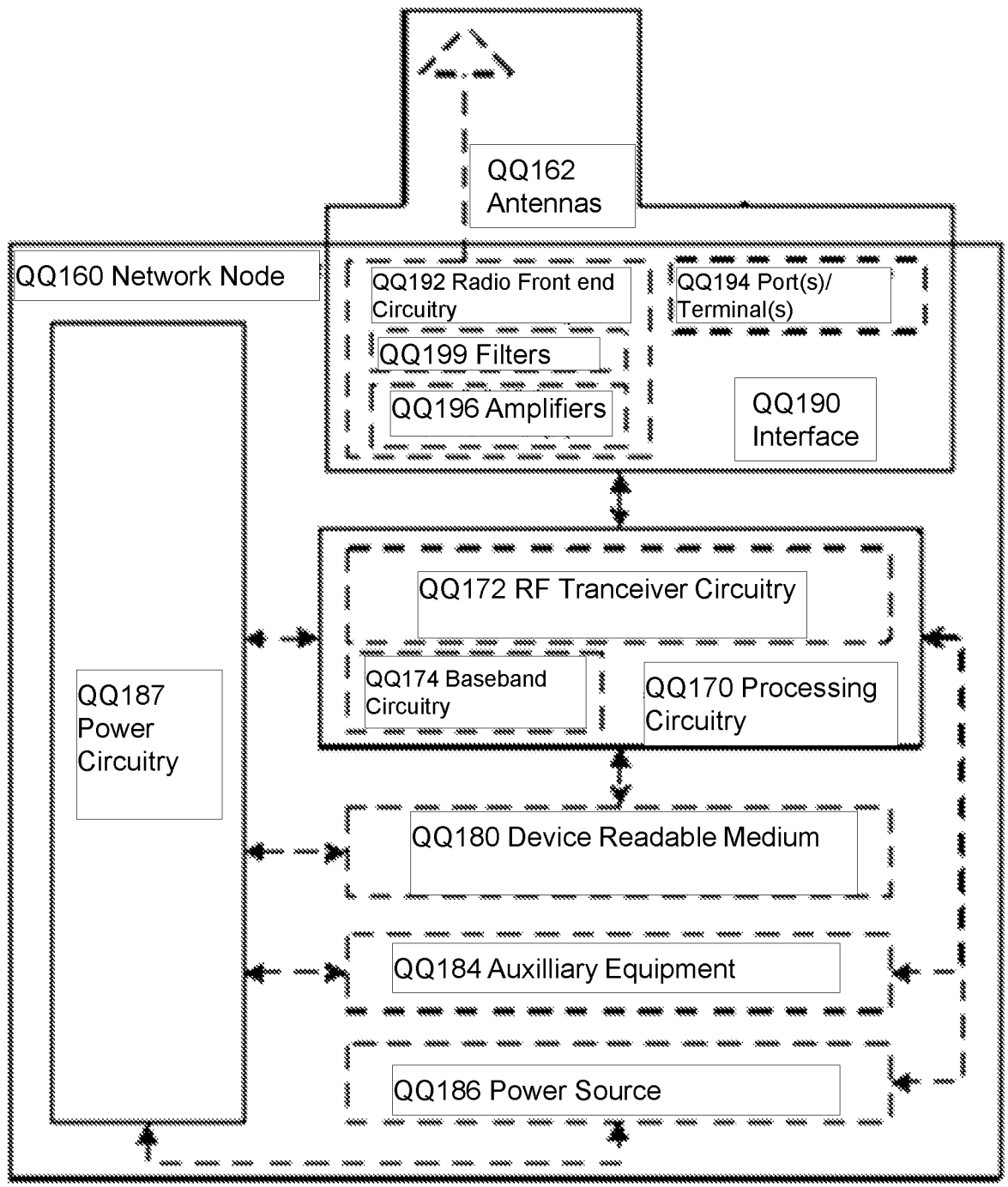
FIG. 5 shows details of a network node according to one or more embodiments of the present disclosure.
Figure 6:
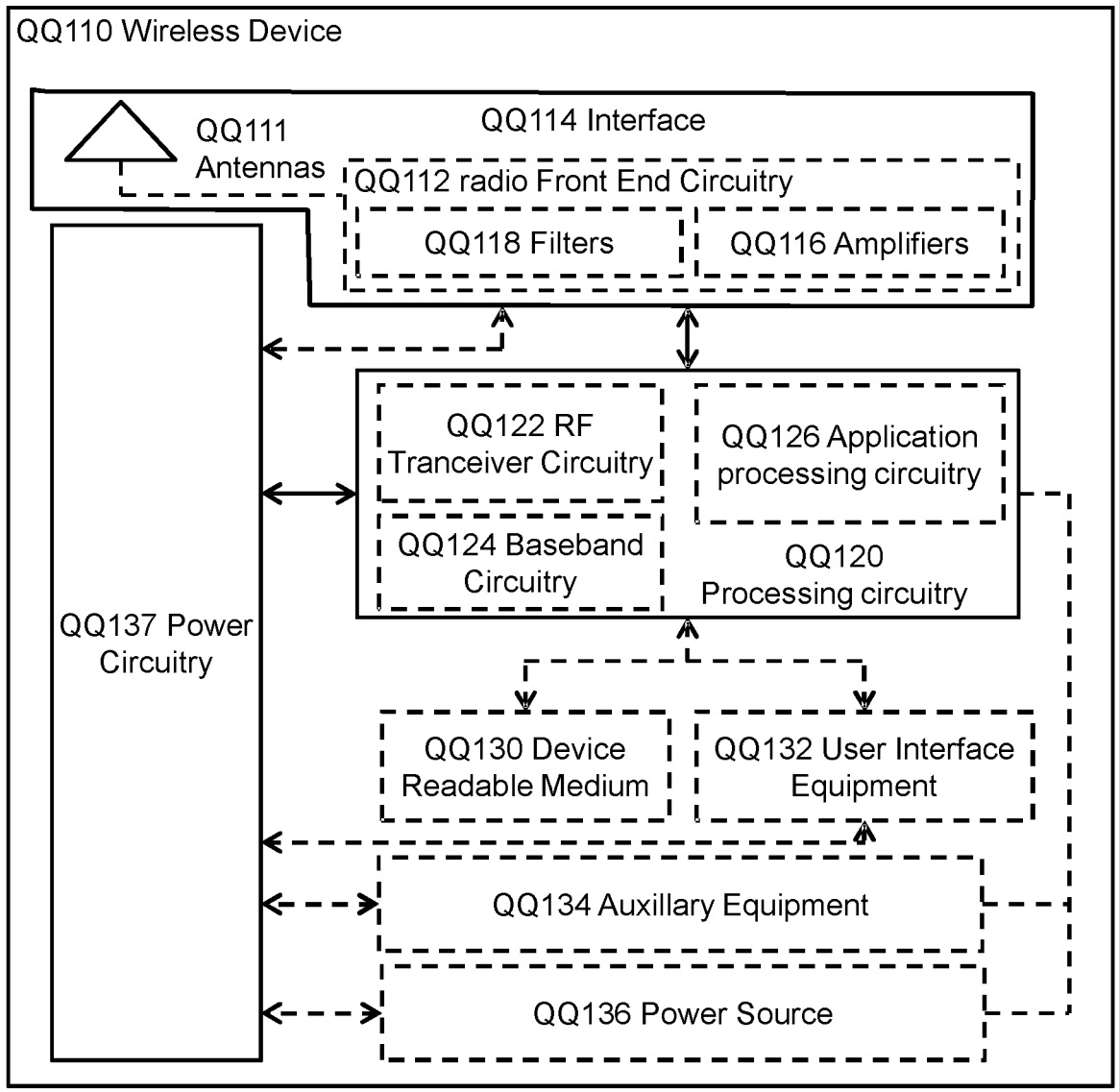
FIG. 6 shows details of a UE according to one or more embodiments of the present disclosure

Network node QQ160 and WD QQ110 comprise various components described in more detail in FIGS. 5 and 6. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, base station/network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points) and base stations (BSs) (e.g. radio base stations, Node Bs, and evolved Node Bs (eNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

FIG. 5 shows details of a network node QQ160 according to one or more embodiments. In FIG. 5, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signaling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 5 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as a machine-type communication (MTC) device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

FIG. 6 shows details of a UE/wireless device QQ110 according to one or more embodiments. As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user. A UE may also comprise any UE identified by the 3rd Generation Partnership Project (3GPP), including a NB-IoT UE that is not intended for sale to, or operation by, a human user. UE QQ200, as illustrated in FIG. 6, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable.

In one embodiment, the UE may be provided with an input/output interface. For example, The output interface may be a speaker, a sound card, a video card, a display, a monitor, a printer, an actuator, an emitter, a smartcard, another output device, or any combination thereof. The input interface may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor. The UE may be configured to provide a communication interface to RF components such as a transmitter, a receiver, and an antenna. The communication interface may encompass wired and/or wireless networks such as a local-area network (LAN), a wide-area network (WAN), a computer network, a wireless network, a telecommunications network, another like network or any combination thereof. The communication interface may be configured to include a receiver and a transmitter interface used to communicate with one or more other devices over a communication network according to one or more communication protocols, such as Ethernet, TCP/IP, SONET, ATM, optical, electrical, and the like). The transmitter and receiver interface may share circuit components, software or firmware, or alternatively may be implemented separately.

The UE may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives, redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The memory may allow UE QQ200 to access computer-executable instructions, application programs or the like, stored on transitory or non-transitory memory media, to off-load data, or to upload data. An article of manufacture, such as one utilizing a communication system may be tangibly embodied in the memory/storage medium, which may comprise a device readable medium.

according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

Figure 7:
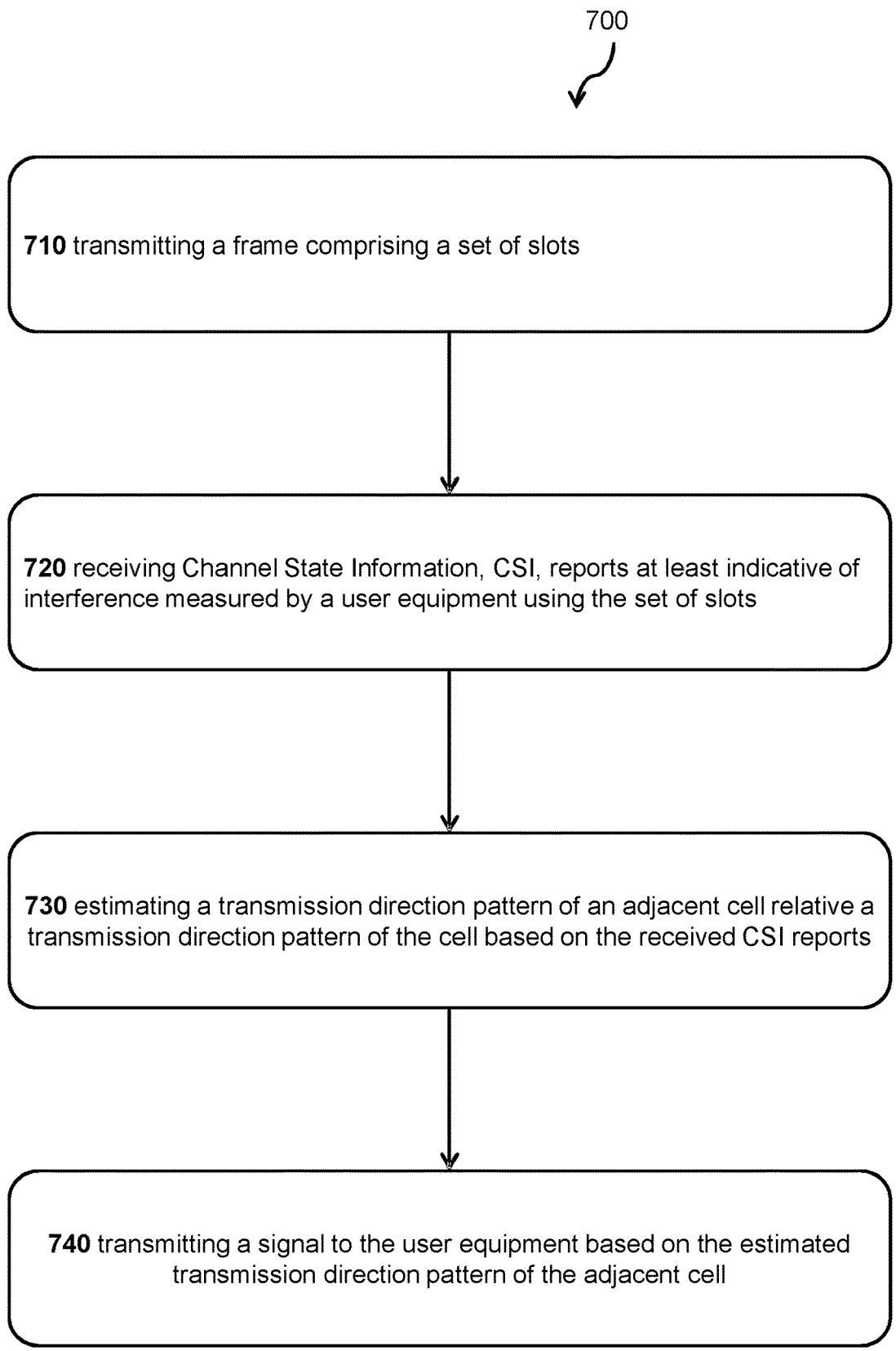
FIG. 7 shows a block diagram of a method for operating a cell according to one or more embodiments of the present disclosure.

FIG. 7 shows a block diagram of a method for operating a cell according to one or more embodiments of the present disclosure. The method is performed by a network node QQ160. The method comprising:

Step 710: transmitting a frame comprising a set of slots. The frame is transmitted comprised in a signal using physical resources, further described in relation to FIG. 1. Each frame comprises a number of time slots or slots, further described in relation to FIG. 2. The set of slots may be selected from all slots comprised in the frame, e.g. using various selection criteria. Various embodiments describing the step of selecting the set of slots is further described in relation to FIG. 9A-C.

In one embodiment, all slots configurable for downlink transmission, by the network node QQ160, are selected to the set of slots.

In one embodiment, all slots configurable for either uplink or downlink transmission, by the network node QQ160, are selected to the set of slots.

Step 720: receiving Channel State Information, CSI, reports at least indicative of interference measured by a user equipment QQ110b using the set of slots. The CSI reports are typically received by the network node QQ160 comprised in a signal from one or more served UEs, e.g. user equipment QQ110b. The signal may be received from the UE using a Physical Uplink Control Channel, PUCCH, or a Physical Uplink Shared Channel, PUSCH.

Step 730: estimating a transmission direction pattern of an adjacent cell relative a transmission direction pattern of the cell based on the received CSI reports. The transmission direction pattern of the adjacent and the transmission direction pattern of the cell of the network node QQ160 is further described in relation to FIG. 3B.

In one embodiment, the transmission direction pattern of the adjacent cell relative the transmission direction pattern of the cell may be determined by comparing a reported interference level and/or a reported channel quality to a predefined threshold.

In one example, with reference to FIG. 3B, the measured interference of slot with index 0, $TS_0$, is below a threshold. It may then be determined that the transmission direction of $TS_0$ at the adjacent cell of the adjacent network node QQ160b is the same as the serving cell of the serving network node QQ160. I.e. the transmission direction pattern may be determined to uplink "U" at the adjacent cell of the adjacent network node QQ160b.

In one further example, with reference to FIG. 3B, the measured interference of slot with index 0, $TS_0$, is equal to or above the threshold. It may then be determined that the transmission direction of $TS_0$ at the adjacent cell of the adjacent network node QQ160b is different to the serving cell of the serving network node QQ160. I.e. the transmission direction pattern may be determined to downlink "D" at the adjacent cell of the adjacent network node QQ160b.

Step 740: transmitting a signal to the user equipment QQ110b based on the estimated transmission direction pattern of the adjacent cell.

In one example, the signal is transmitted using a slot where the network node QQ160 has estimated a transmission direction pattern indicative of that the transmission direction of the network node QQ160 and the adjacent network node QQ160b in the slot are the same, e.g. both nodes transmitting in downlink using the same slot.

In yet one example, the signal is transmitted using a slot where the network node QQ160 has estimated a transmission direction pattern indicative of that the transmission direction of the network node QQ160 and the adjacent network node QQ160b in the slot are different, and has therefore adapted the link for the slot, e.g. adapted coding or modulation.

To further improve the accuracy of the estimation of transmission direction pattern, measurements may be aggregated to a statistical measure.

In one embodiment, the method further comprises calculating a statistical measure of interference levels, of each slot of the set of slots, using the CSI reports and previously received historical CSI reports and where the one or more transmission direction patterns of the one or more adjacent cells are estimated using the statistical measures.

In one example, the statistical measure is calculated as an average of interference levels over subsequent measurement reports.

In a further example, the statistical measure is calculated as a histogram over interference levels for each slot for which CSI is reported. Even if one slot in general has CLI it can have low interference levels in TTIs where this slot isn't scheduled. Such situations can be easier spotted using a histogram than if using the average.

The measurements of the UE are configured by the network node QQ160 by sending a signal comprising a CSI measurement configuration message.

In one embodiment, the method further comprises sending a Channel State Information, CSI, measurement configuration message indicative of the set of slots to the user equipment QQ110b.

As the channel may be changing relatively slowly compared to the CLI/interference related to transmission direction configuration, the overhead may be reduced by measuring the channel less frequent.

In one embodiment, the measurement configuration message is further indicative of interference measurements in every slot of the set of slots and channel measurements in a subset of the set of slots.

In some embodiments, a first iteration is performed where all slots configured for downlink transmission at the network node QQ160 are used to measure interference, i.e. configured with CSI-IM, and additionally or alternatively used to measure the channel, i.e. configured with CSI-IM. In following or subsequent iterations/transmissions of a frame/radio frame, the number of slots used for interference measurements and/or channel measurements may be reduced.

In one embodiment, the method further comprises: selecting an updated set of slots being selected from all slots comprised in the frame, and repeating the steps 710-740 using the updated set.

The advantage of this embodiment is that overhead can be reduced whilst maintaining an acceptable quality of the information indicating CLI/interference and/or channel quality between the network node QQ160 and the UE QQ110b.

In one embodiment, the updated set is selected in a similar manner to what is described in relation to FIG. 9B. I.e. once the network node QQ160 has received CSI reports indicative of interference in all slots configured for downlink transmission at the network node QQ160, and has estimated a transmission direction pattern of one or more adjacent cells, relative a transmission direction pattern of the cell of the network node QQ160, the network node QQ160 then knows about the uplink-downlink transmission direction configurations used by the one or more neighboring cells. It can then figure out or determine in which slots to measure to capture all combinations of uplink-downlink transmission direction related interference from neighboring cells In one embodiment, if interference measurements in several slots of a frame seem to be static or stationary, measurements in only one of these slots can be performed for later CSI reporting instances. Stationary is used here to signify "does not vary much" or "stays within certain limits" or interference variations where a slot causing CLI is not scheduled in a specific radio frame.

In one embodiment, the method further comprises determining that one or more of the statistical measures are stationary and selecting only one slot out of the corresponding slots, having the stationary statistical measures, to be included in the updated set.

In some embodiments, the periodicity is reduced after the initial iteration of the method. In one embodiment, the periodicity of the CSI-RS/CSI-IM may be an integer multiple of the number of slots in the radio frame (or the number of slots in the TDD periodicity for NR) such that the CSI-RS/CSI-IM are only present in each N:th radio frame but such that the relative positions of the CSI-RS/CSI-IM within a radio frame where they are present is the same for all such radio frames.

In one embodiment, the updated set is selected only for every Nth frame, wherein the number N is selected as a multiple of a total number of slots in the frame.

In one embodiment, the number N is adapted dependent on how quickly the channel changes, ignoring the short-term interference variations caused by different uplink-downlink configurations in neighboring cells, as each CSI report is by configuration only associated with a certain combination of neighboring cell UL/DL configuration. In the above examples, the period of the periodic CSI reports can be 10 slots in case the channel varies quickly. A larger period of X times 10 slots can be used if the channel variations are slower.

In one embodiment, the number N is selected dependent on a channel measure indicative of how fast a channel between the network node QQ160 and the user equipment QQ110b changes.

The CSI-reports can be used for improved link adaptation (MCS selection) but also for scheduling avoiding severely interfered slots in the time-frequency grid. The scheduling can be combined with quality of service requirement such as avoiding symbols with identified probability for UE-UE interference for delay sensitive services.

In one embodiment, the CSI reports are further indicative of channel quality of one or more slots of the set of slots, wherein the step of transmitting 830 further comprises estimating channel quality for the remaining slots comprised in the frame using the one or more transmission direction patterns of one or more adjacent cells and the channel quality of the CSI report, and scheduling slot transmission and/or performing slot link adaptation using the channel quality of the CSI report and the estimated channel quality.

Figure 8:
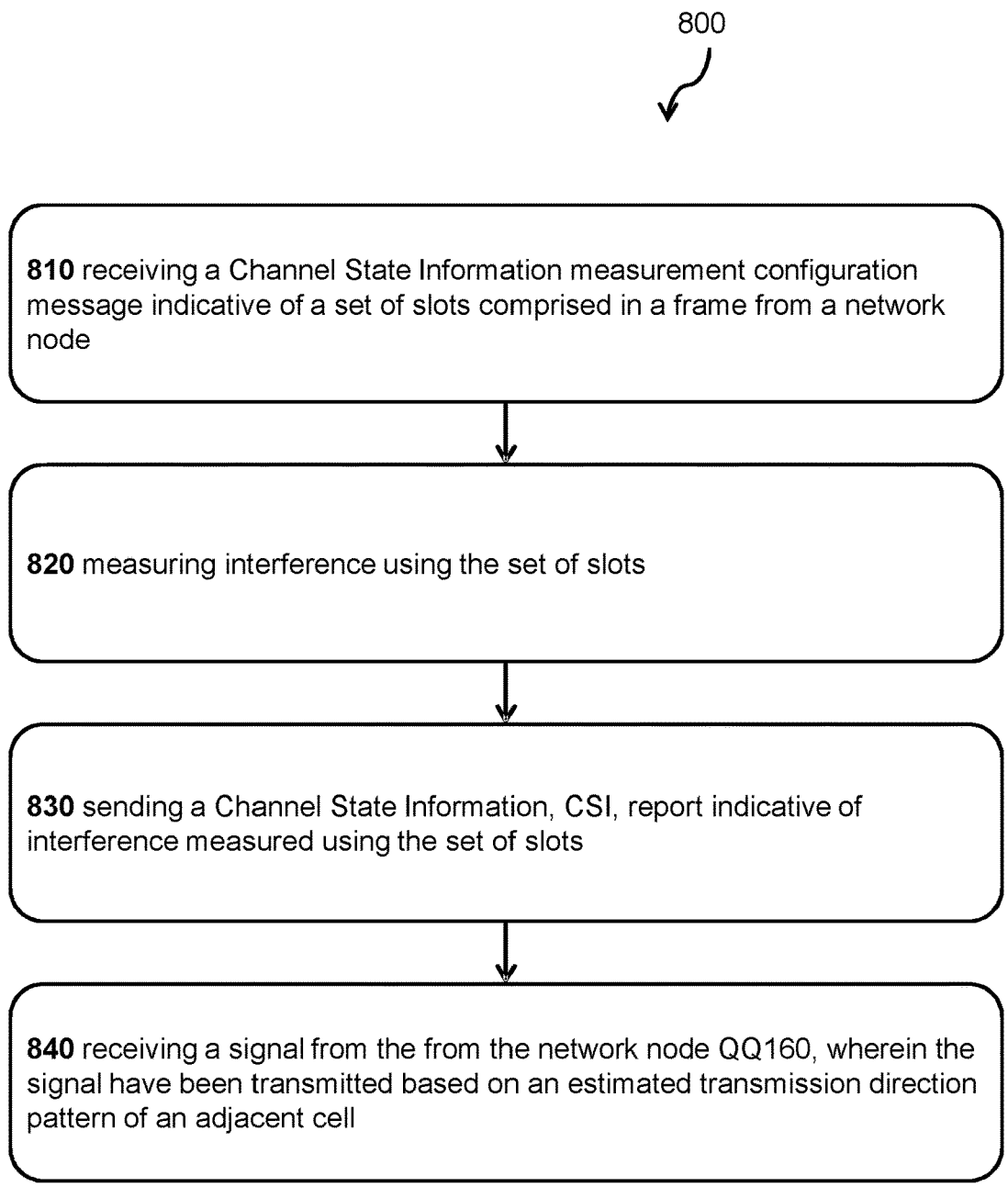
FIG. 8 shows a block diagram of a method according to one or more embodiments of the present disclosure.

FIG. 8 shows a block diagram of a method according to one or more embodiments of the present disclosure. The method is performed by a user equipment UE QQ110b. The method comprising:

Step 810: receiving a Channel State Information, CSI, measurement configuration message indicative of a set of slots comprised in a frame from a network node QQ160.

The CSI measurement configuration message is received comprised in a signal using physical resources, further described in relation to FIG. 1. Each frame comprises a number of time slots or slots, further described in relation to FIG. 2.

Step 820: measuring interference using the set of slots.

The interference may be measured using CSI-IM or zero power CSI-RS comprised in the slots to be measured.

Step 830: sending a Channel State Information, CSI, report indicative of interference measured using the set of slots.

The CSI report may be sent comprised in a signal. The signal may be sent by the UE using a Physical Uplink Control Channel, PUCCH, or a Physical Uplink Shared Channel, PUSCH.

Step 840: receiving a signal from the from the network node QQ160, wherein the signal have been transmitted based on an estimated transmission direction pattern of an adjacent cell.

In one example, the signal is received on using a slot where the network node QQ160 has estimated a transmission direction pattern indicative of that the transmission direction of the network node QQ160 and the adjacent network node QQ160b in the slot are the same, e.g. both nodes transmitting in downlink using the slot.

In yet one example, the signal is received on using a slot where the network node QQ160 has estimated a transmission direction pattern indicative of that the transmission direction of the network node QQ160 and the adjacent network node QQ160b in the slot are different, and has therefore adapted the link for the slot, e.g. adapted coding or modulation.

In one embodiment, the measurement configuration message is further indicative of interference measurements to be performed and/or channel measurements to be performed.

In one embodiment, the measurement configuration message is further indicative of interference measurements to be performed in every slot of the set of slots, and, channel measurements to be performed in a subset of the set of slots, where interference is measured in every slot of the set of slots and the channel is measured in a subset of the set of slots.

FIG. 9A-C shows examples of measurement configurations or CLI reporting configurations according to one or more embodiments of the present disclosure. As mentioned previously, the CLI interference situation in a TDD system varies within a radio frame and depends to a large extent upon the uplink-downlink transmission direction configurations used by adjacent or neighboring cells. Furthermore, within one cell the interference impact and interference slot-pattern will be different for each UE depending on its radio position in the cell and relatively UEs in neighbor cells transmitting in the UL. Each UE can measure individually per slot/symbol and may further classify the slots/symbols with interference on the same levels.

If the base station doesn't have any information about neighboring cells uplink-downlink configurations, it may have to measure interference in all slots within a radio frame.

In FIG. 9A a CLI reporting configuration is shown, where each DL slot is configured with a CSI-RS for channel measurement and a CSI-IM for interference measurement. However, since the maximum UE capability is 4 CSI report settings for each time-domain behavior of the CSI report, it is not possible to configure 6 periodic CSI reports. The example shown in FIG. 9A thus has to be implemented with aperiodic CSI reports or with a mix of periodic and aperiodic CSI reports.

In one embodiment, all slots configurable for downlink transmission, by the network node QQ160, are selected to the set of slots.

In one example, with reference to FIG. 3B $TS_0$ and $TS_5$ are selected to the set of slots. Optionally, the flexible slots in the transmission direction pattern of QQ160, i.e. $TS_1$, $TS_4$ $TS_6$ and $TS_9$, which are configured for downlink transmission direction are also selected to the set of slots.

In a further embodiment, all flexible slots are selected to the set of slots, i.e. all slots configurable for either uplink or downlink transmission are selected to the set of slots.

In one embodiment, all slots configurable for either uplink or downlink transmission, by the network node QQ160, are selected to the set of slots.

In one example, with reference to FIG. 3B, $TS_1$, $TS_4$ $TS_6$ and $TS_9$ are selected to the set of slots.

In cases where NR slot formats other than 0 and 1 are used, the interference pattern may even vary on symbol level. Measuring interference for each symbol in a radio frame is however not preferred due to the large overhead introduced, and it is therefore difficult to capture the interference variations due to varying transmission directions in the CSI reports. In particular if the uplink-downlink configurations of neighboring cells are unknown and varies on a symbol level.

By collecting long term statistics within a cell, the uplink-downlink configurations used in neighboring cells or adjacent operator network cells can be identified and the CSI-IM and CSI-RS measurement can be reduced similar to when the configuration is known.

In one embodiment, the method further comprises:
calculating a statistical measure of interference levels, of each slot of the set of slots, using the CSI reports and previously received historical CSI reports, and wherein the one or more transmission direction patterns of the one or more adjacent cells are estimated using the statistical measures.

As mentioned previously the CLI reporting/CLI measurements are configured by sending CSI report/measurement configuration message from the network node QQ160 to the UE QQ110b. The CSI report/measurement configuration message may be indicative of any of radio frame index, slot index, slot transmission direction, channel measurement (CSI-RS), measured channel, interference measurement (CSI-IM) and CSI estimate and report.

In some embodiments, the method further comprises sending a CSI report/measurement configuration message at least indicative of the set of slots to the user equipment QQ110b.

In one embodiment, the method further comprises:
sending a Channel State Information, CSI, report/measurement configuration message indicative of the set of slots to the user equipment QQ110b.

In the example shown in FIG. 9A, this may include indicating that all slots configured for downlink transmission direction, shown as "D" in the figure, are included in the (selected) set of slots and should be used to perform interference measurements.

In FIG. 9B a CLI measurement/reporting configuration is shown, where each DL slot is configured with a CSI-IM for interference measurement and a subset of the set of slots are configured with a CSI-RS for channel measurement. In this alternative embodiment, CSI-RS may be configured only in a subset of the DL slots for channel measurement, but where CSI-IM is configured in every downlink slot. An example is shown in FIG. 9B, where CSI-RS with a periodicity of 5 slots are configured. In NR Rel-15, the configuration shown in this example can be implemented with a mix of periodic and aperiodic CSI reports. For example, periodic CSI reports CSI(m) and CSI(m+1) may be configured with periodic CSI-RS and CSI-IM in slots k and k+5, and aperiodic CSI reports with periodic CSI-RS (on slots k and k+5) and periodic CSI-IM resources (period=X times 10 slots with slot offsets 6, 7, 8, 9) for CSI(m+2) to CSI(m+5).

In some embodiments, interference measurements as well as channel measurements are configured and performed.

In one embodiment, the measurement configuration message is further indicative of:
interference measurements and/or channel measurements of the set of slots and/or a subset of the set of slots.

As mentioned previously, the channel between the network node QQ160 and the UE QQ110b may change relatively slowly, relative to the change in interference/CLI.

Therefore, overhead can be reduced whilst maintaining sufficient quality of the information by performing interference measurements more often than channel measurements are performed.

In one embodiment, the measurement configuration message is further indicative of interference measurements in every slot of the set of slots and/or channel measurements in a subset of the set of slots.

In one embodiment, all slots configurable for downlink transmission, by the network node QQ160, are selected to the set of slots.

Once the network node QQ160 has received CSI reports indicative of interference in all slots configured for downlink transmission at the network node QQ160, and has estimated a transmission direction pattern of one or more adjacent cells, relative a transmission direction pattern of the cell of the network node QQ160, the network node QQ160 then knows about the uplink-downlink transmission direction configurations used by the one or more neighboring cells. It can then figure out or determine in which slots to measure to capture all combinations of uplink-downlink transmission direction related interference from neighboring cells. In one example, with reference to FIG. 3B, at least $TS_7$ and $TS_8$ can be determined as slots to measure. That is, a number of characteristic slots for interference measurement and/or channel measurement, e.g. CQI measurement, is selected. Given the CSI-RS measurement for one reference slot and the interference measurements from the CSI-IM measurements, the CQI for each slot can be estimated.

In FIG. 9C a CLI measurement/reporting configuration is shown, where a set of slots selected using a transmission direction pattern of an adjacent cell is configured with CSI-IM for interference measurements configured with a CSI-RS for channel measurements. An example is shown in FIG. 9C, where CSI is measured in slots each having different DL interferences from adjacent cells. In NR Rel-15, the configuration shown in FIG. 9C 4 can be implemented with a mix of periodic and aperiodic CSI reports. For example, CSI(m) can be implemented with a periodic CSI report with periodic CSI-RS and CSI-IM in slots k, and aperiodic CSI reports on periodic CSI-RS (on slots k) and periodic CSI-IM resources (period=X times 10 slots with slot offsets 6, 8) for CSI(m+1) to CSI(m+2).

In all embodiments described above, one CSI report is configured for each of the slots where channel or interference is measured. The periodicity, e.g. the number of slots in each frame or radio frame, of each of these CSI reports can thereby be configured based on different criteria.

In some embodiments, a first iteration is performed where all slots configured for downlink transmission at the network node QQ160 are used to measure interference, i.e. configured with CSI-IM, and additionally or alternatively used to measure the channel, i.e. configured with CSI-IM. In following or subsequent iterations/transmissions of a frame/radio frame, the number of slots used for interference measurements and/or channel measurements may be reduced.

Finally, it should be understood that the invention is not limited to the embodiments described above, but also relates to and incorporates all embodiments within the scope of the appended independent claims.

The invention claimed is:

1. A method for operating a cell, performed by a network node, the method comprising:
transmitting a frame comprising a set of slots;
receiving Channel State Information, CSI, reports at least indicative of interference measured by a user equipment using the set of slots;
estimating a transmission direction pattern of an adjacent cell relative to a transmission direction pattern of the cell based on the received CSI reports;
transmitting a signal to the user equipment based on the estimated transmission direction pattern of the adjacent cell;
calculating a statistical measure of interference levels, of each slot of the set of slots, using the CSI reports and previously received historical CSI reports;
the transmission direction pattern of the adjacent cell estimated using the statistical measure;
determining that the statistical measure is stationary; and
selecting only one slot out of the corresponding slots having the stationary statistical measure for later CSI reporting instances.

2. The method according to claim 1, wherein all slots configurable for downlink transmission, by the network node, are selected to the set of slots.

3. The method according to claim 2, wherein all slots configurable for one of uplink and downlink transmission, by the network node, are selected to the set of slots.

4. The method according to claim 2, further comprising:
sending a Channel State Information, CSI, measurement configuration message indicative of the set of slots to the user equipment.

5. The method according to claim 2, wherein the measurement configuration message is further indicative of:
interference measurements in every slot of the set of slots; and
channel measurements in a subset of the set of slots.

6. The method according to claim 2, further comprising:
selecting an updated set of slots being selected from all slots comprised in the frame; and
repeating the steps of claim 1 using the updated set.

7. The method according to claim 1, wherein all slots configurable for one of uplink and downlink transmission, by the network node, are selected to the set of slots.

8. The method according to claim 1, further comprising:
sending a Channel State Information, CSI, measurement configuration message indicative of the set of slots to the user equipment.

9. The method according to claim 8, wherein the measurement configuration message is further indicative of:
interference measurements in every slot of the set of slots; and
channel measurements in a subset of the set of slots.

10. The method according to claim 1, further comprising:
selecting an updated set of slots being selected from all slots comprised in the frame; and
repeating the steps of claim 1 using the updated set.

11. The method according to claim 10, wherein the updated set is selected only for every Nth frame, wherein the number N is selected as a multiple of a total number of slots in the frame.

12. The method according to claim 11, wherein the number N is selected dependent on a channel measure indicative of how fast a channel between the network node and the user equipment changes.

13. The method according to claim 1, wherein the CSI reports are further indicative of channel quality of one or more slots of the set of slots, wherein the transmitting further comprises:
estimating channel quality for the remaining slots comprised in the frame using the one or more transmission direction patterns of one or more adjacent cells and the channel quality of the CSI report; and
at least one of scheduling slot transmission and performing slot link adaptation using the channel quality of the CSI report and the estimated channel quality.

14. A method performed by a user equipment, the method comprising:
receiving a Channel State Information, CSI, measurement configuration message indicative of a set of slots comprised in a frame from a network node;
measuring interference using the set of slots;
sending a Channel State Information, CSI, report indicative of interference measured using the set of slots; and
receiving a signal from the network node, the signal having been transmitted based on an estimated transmission direction pattern of an adjacent cell, and been based on a calculated statistical measure of interference levels, of each slot of the set of slots, using the CSI reports and previously received historical CSI reports, the transmission direction pattern of the adjacent cell having been estimated using the statistical measure, having been determined that the statistical measure is stationary, and having been selected as only one slot out of the corresponding slots, having the stationary statistical measure, for later CSI reporting instances.

15. The method according to claim 14, wherein the measurement configuration message is further indicative of interference measurements to be performed in every slot of the set of slots, and, channel measurements to be performed in a subset of the set of slots; and
wherein interference is measured in every slot of the set of slots and the channel is measured in a subset of the set of slots.

16. A network node comprising:
processing circuitry configured to:
transmit a frame comprising a set of slots;
receive Channel State Information, CSI, reports at least indicative of interference measured by a user equipment using the set of slots;
estimate a transmission direction pattern of an adjacent cell relative a transmission direction pattern of the cell based on the received CSI reports;
transmit a signal to the user equipment based on the estimated transmission direction pattern of the adjacent cell;
calculate a statistical measure of interference levels, of each slot of the set of slots, using the CSI reports and previously received historical CSI reports;
the transmission direction pattern of the adjacent cell estimated using the statistical measure;
determine that the statistical measure is stationary; and
select only one slot out of the corresponding slots, having the stationary statistical measure, for later CSI reporting instances.

17. A user equipment comprising:
processing circuitry configured to:
receive a Channel State Information, CSI, measurement configuration message indicative of a set of slots comprised in a frame from a network node;
measure interference using the set of slots;
send a Channel State Information, CSI, report indicative of interference measured using the set of slots; and
receive a signal from the network node, the signal being configured to have been transmitted based on an estimated transmission direction pattern of an adjacent cell, using the CSI reports and previously received historical CSI reports, the transmission direction pattern of the adjacent cell estimated using the statistical measure, and having been determines that the statistical measure is stationary, and having been selected as only one slot out of the corresponding slots, having the stationary statistical measure, for later CSI reporting instances.

* * * * *